United States Patent [19]

Wusterbarth

[11] Patent Number: 4,723,577
[45] Date of Patent: Feb. 9, 1988

[54] THERMAL EXPANSION RESERVOIR

[75] Inventor: Michael A. Wusterbarth, Kiel, Wis.

[73] Assignee: Sundstrand Corporation, Rockford, Ill.

[21] Appl. No.: 921,747

[22] Filed: Oct. 22, 1986

[51] Int. Cl.$^4$ ............................................. F16L 55/04
[52] U.S. Cl. ..................................... 138/30; 220/85 B
[58] Field of Search .................... 138/26, 30; 220/85 B

[56] References Cited

U.S. PATENT DOCUMENTS

| | | | |
|---|---|---|---|
| 2,283,439 | 5/1942 | Herman | 220/85 B |
| 2,299,611 | 10/1942 | Clark | 220/85 B |
| 2,339,876 | 1/1944 | Phillips | 220/85 B |
| 2,737,453 | 3/1956 | Larsen . | |
| 2,786,488 | 3/1957 | Mercier . | |
| 2,924,359 | 2/1960 | Beremand . | |
| 3,158,296 | 11/1964 | Cornelius . | |
| 3,220,594 | 11/1965 | Ortheil et al. | 138/30 X |
| 3,409,714 | 11/1968 | Strugar, Jr. . | |
| 3,477,473 | 11/1969 | Henry-Biaband | 138/30 |
| 3,830,259 | 8/1974 | Mercier . | |
| 4,135,635 | 1/1979 | Fujii et al. . | |
| 4,162,692 | 7/1979 | Greer et al. | 138/30 |
| 4,186,776 | 2/1980 | Burton | 138/30 |
| 4,195,668 | 4/1980 | Lewis | 138/30 |
| 4,213,545 | 7/1980 | Thompson et al. . | |
| 4,234,016 | 11/1980 | Horino | 138/30 |
| 4,234,017 | 11/1980 | Mercier . | |
| 4,408,635 | 10/1983 | Packer | 138/30 |

FOREIGN PATENT DOCUMENTS 2499170  8/1982  France ................................. 138/30

Primary Examiner—James E. Bryant, III
Attorney, Agent, or Firm—Wood, Dalton, Phillips, Mason & Rowe

[57] ABSTRACT

In order to accommodate expansion and contraction in a fuel system, even in the presence of extremes of temperature, while maintaining the fuel system pressure at ambient, a thermal expansion reservoir is provided. The thermal expansion reservoir includes a rigid housing having releasably interconnected first and second housing portions provided with a fluid inlet port and a vent. A resilient bladder is disposed within the housing between the inlet port and the vent in a manner dividing the housing into a fluid expansion chamber and a pressure relief chamber, each of variable size depending upon the fluid pressure in the fluid expansion chamber. A redundant seal arrangement is integrally associated with the resilient bladder to form primary and secondary seals between the housing portions while joining the resilient bladder to the housing. The thermal expansion reservoir is also formed such that the resilient bladder has a first wall portion leading from the housing in the direction of the vent to a return bend and a second wall portion leading from the return bend in the direction of the inlet port to an end cap. With this construction, the return bend initiates rolling of the second wall portion toward the vent and the second wall portion is tapered to promote rolling of the second wall portion toward the vent in an automatically controlled and substantially frictionless fashion.

16 Claims, 4 Drawing Figures

THERMAL EXPANSION RESERVOIR

FIELD OF THE INVENTION

The present invention relates to the problem of expansion and contraction in fuel systems and, more particularly, to a thermal expansion reservoir for accommodating expansion and contraction caused by temperature extremes.

BACKGROUND OF THE INVENTION

Certain fuel systems are sometimes subjected to extreme temperature variations which cause the fuel to expand and contract. One such fuel system is for an open cycle turbine engine of the type that may be used in connection with torpedoes and the like, and such a fuel system can be subjected to storage in tropic or arctic conditions which would cause the fuel to expand or contract substantially, thus causing harmful pressure levels and potential damage to the fuel system. As a result, expansion and contraction must be accommodated in a manner that will eliminate or reduce the possibility of damage to the fuel system.

For this purpose, it has been recognized that a thermal expansion reservoir can be utilized in an advantageous fashion. This allows the fuel in the fuel system to expand and contract within the reservoir so as to maintain pressure levels in the fuel system within safe parameters. However, while recognized as useful, it has remained to provide a thermal expansion reservoir that will operate in an entirely satisfactory fashion.

More particularly, a fuel system for a torpedo is stored in a primed condition. In order to provide a constant pressure system whereby fuel can expand and contract freely despite the extremes of the arctic or tropics, and yet withstand a transition from atmospheric pressure to very high pressures that are normally seen with current torpedo technology, the housing and seal means of a thermal expansion reservoir must cooperate in a fail-safe manner, even if subjected to long periods of storage before use. Additionally, the thermal expansion reservoir must operate in a relatively frictionless manner, must easily be disassembled for cleaning, and must be compact to easily conform to a small envelope in a torpedo.

Among the attempts to provide a thermal expansion reservoir are those disclosed in Mercier U.S. Pat. Nos. 4,234,017; 3,830,259; and 2,786,488. The Mercier patents disclose pressure vessels in the form of rigid containers having a pair of ports at their respective ends with deformable partitions or bladders for separating two fluids such as the gas or liquid under pressure in the container. Unfortunately, the Mercier '017, '259, and '488 patents all fail to provide a redundant seal, a largely expansible or contractible chamber, or a bladder that is capable of rolling in a frictionless manner.

Strugar U.S. Pat. No. 3,409,714 does disclose a collapsible inner container accommodating the refilling thereof. It does not, however, disclose a redundant seal, nor does it suggest a resilient bladder that is capable of rolling in a frictionless manner in the presence of extremes of pressure caused by thermal variations that can be experienced in arctic or tropic conditions. In fact, the principal purpose of the Strugar et al '714 device is to provide a fuel tank with complete containment of automobile system vapors.

Beremand U.S. Pat. No. 2,924,359 discloses an expulsion bag fuel tank for use in aircraft and missiles that is adapted to store a supply of fuel under pressure. It, however, could not accommodate rolling of a resilient bladder since it utilizes an inner collapsible expulsion bag that is supported by an apertured rigid inner tank liner. Moreover, the Beremand '359 patent does not disclose an integral redundant seal.

The present invention is directed to overcoming the above stated problems and accomplishing the stated objects by providing a thermal expansion reservoir which can be disassembled, provides redundant sealing, and has a resilient bladder capable of automatic and controlled frictionless roll-up action.

SUMMARY OF THE INVENTION

Accordingly, the present invention is directed to a thermal expansion reservoir including a rigid housing having first and second housing portions. The housing also has a fluid inlet port in one of the first and second housing portions and a vent in the other of the first and second housing portions. Moreover, the thermal expansion reservoir includes means for releasably interconnecting the housing portions which are telescopically overlapped.

Further, the thermal expansion reservoir includes a resilient bladder disposed within the housing between the inlet port and the vent. The resilient bladder divides the housing into a fluid expansion chamber and a pressure relief chamber and is movable toward and away from the vent to vary the relative size of the fluid expansion chamber and the pressure relief chamber responsive to changes in fluid pressure in the fluid expansion chamber. Moreover, the resilient bladder is joined to the housing between the housing portions.

With this construction, redundant seal means are integrally associated with the resilient bladder. The redundant seal means are disposed in spaced relation and cooperate with the releasable interconnecting means to form primary and secondary seals between the housing portions. Still more particularly, the redundant seal means serve to join the resilient bladder to the housing.

In the exemplary embodiment, the first and second housing portions each include a generally cylindrical wall terminating in a dome-shaped end. The dome-shaped ends of the first and second housing portions are disposed in axially spaced relation remote from the redundant seal means of the resilient bladder. The generally cylindrical walls are of substantially identical diameter with one of the generally cylindrical walls having an enlarged diameter wall portion remote from the dome-shaped ends. With this arrangement, the enlarged diameter wall portion can telescopically receive the other of the generally cylindrical walls at a point intermediate the inlet port and the vent.

With regard to the redundant seal means, a pair of integral radially inwardly projecting rings are preferably disposed in axially spaced relation on the resilient bladder. The radially inwardly projecting rings are adapted to be received in sealing retention fashion within a pair of circumferentially extending grooves in the generally cylindrical wall of uniform diameter. As will be appreciated, the cooperation of the radially inwardly projecting rings with the circumferentially extending grooves serves to create a seal while also joining the resilient bladder to the housing.

In another aspect of the invention, the thermal expansion reservoir includes a rigid housing having a fluid inlet port in one end and a vent in the other end. The resilient bladder is disposed within the housing between the inlet port and the vent and is joined to the housing intermediate the inlet port and the vent. In addition, the resilient bladder has a first wall portion leading from the housing in the direction of the vent to a return bend and a second wall portion leading from the return bend in the direction of the inlet port to an end cap. The return bend is formed to initiate rolling of the second wall portion toward the vent and the second wall portion is tapered to promote rolling toward the vent responsive to an increase in fluid pressure in the fluid expansion chamber. With this arrangement, the resilient bladder thereafter is adapted to roll away from the vent in the direction of the inlet port and away from the inlet port in the direction of the vent responsive to further changes in fluid pressure in the fluid expansion chamber.

Still more particularly, the end cap is preferably an integral thickened portion of the resilient bladder, and the vent has a conical bore facing the pressure relief chamber and the end cap. Preferably, the conical bore has a gradually reduced diameter in a direction away from the pressure relief chamber. With this arrangement, the end cap is greater in diameter than the maximum diameter of the conical bore and is disposed in axial alignment with the conical bore to prevent extrusion of the resilient bladder into the vent.

Other objects, advantages and features of the present invention will become apparent from the following specification taken in conjunction with the accompanying drawings.

DETAILED DESCRIPTION OF THE PREFERRED EMBODIMENT

Figure 1:
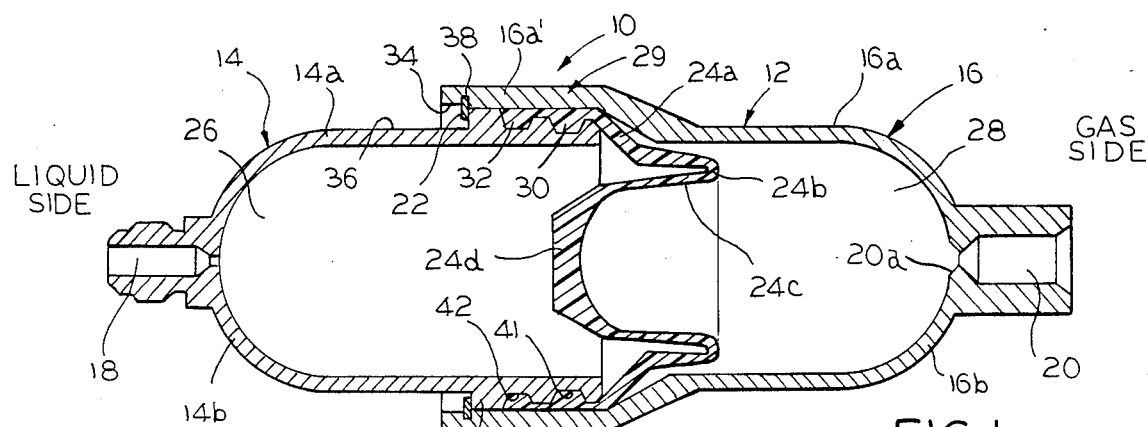
FIG. 1 is a cross-sectional view of a thermal expansion reservoir in a primed condition in accordance with the present invention.

An exemplary embodiment of a thermal expansion reservoir in accordance with the invention is illustrated in FIG. 1. The thermal expansion reservoir 10 includes a rigid housing 12 having a first housing portion 14 and a second housing portion 16 where the housing is provided with a fluid inlet port 18 in one of the first and second housing portions 14 and a vent 20 in the other of the first and second housing portions 16. In addition, a snap ring 22 is provided as means for releasably interconnecting the housing portions 14 and 16.

Still referring to FIG. 1, the thermal expansion reservoir 10 also includes a resilient bladder 24 disposed within the housing 12 between the inlet port 18 and the vent 20. The resilient bladder 24 divides the housing 12 into a fluid expansion chamber 26 and a pressure relief chamber 28 and is movable toward and away from the vent 20 to vary the relative size of the fluid expansion chamber 26 and the pressure relief chamber 28 responsive to changes in fluid pressure in the fluid expansion chamber 26. As will be discussed hereinafter in greater detail, the resilient bladder 24 is joined to the housing 12 between the housing portions 14 and 16.

As shown, redundant seal means 29 are integrally associated with the resilient bladder 24. The redundant seal means 29 are disposed in spaced relation and cooperate with the releasable interconnecting means or snap ring 22 to form primary and secondary seals 30 and 32, respectively, between the housing portions 14 and 16. As will be appreciated, the redundant seal means 29 also join the resilient bladder 24 to the housing 12.

Preferably, the first and second housing portions 14 and 16 each include a generally cylindrical wall 14a and 16a terminating in a dome-shaped end 14b and 16b, respectively, with the dome-shaped ends 14b and 16b of the first and second housing portions 14 and 16 being disposed in axially spaced relation remote from the redundant seal means 29 of the resilient bladder 24. Moreover, the generally cylindrical walls 14a and 16a are of substantially identical diameter with one of the generally cylindrical walls 16a having an enlarged diameter wall portion 16a remote from the dome-shaped ends 14b and 16b for telescopically receiving the other of the generally cylindrical walls 14a intermediate the inlet port 18 and the vent 20.

As previously mentioned, the releasable interconnecting means includes a snap ring 22 disposed between an inner surface 34 of the enlarged diameter wall portion 16a' of the one of the walls 16a and an outer surface 36 of the other of the walls 14a in externally spaced relation to the redundant seal means 29. More particularly, the snap ring 22 is disposed in a radially inwardly facing groove 38 in the inner surface 34 of the enlarged diameter wall portion 16a ' resting against a radially outwardly extending flange 40 on the generally cylindrical wall 14a whereby it holds the first and second housing portions 14 and 16 together in assembled relationship. With this arrangement, the snap ring 22 can be removed when it is desired to clean the interior of the housing 12 after which disassembly can be made by telescopically separating the first and second housing portions 14 and 16.

Figure 2:
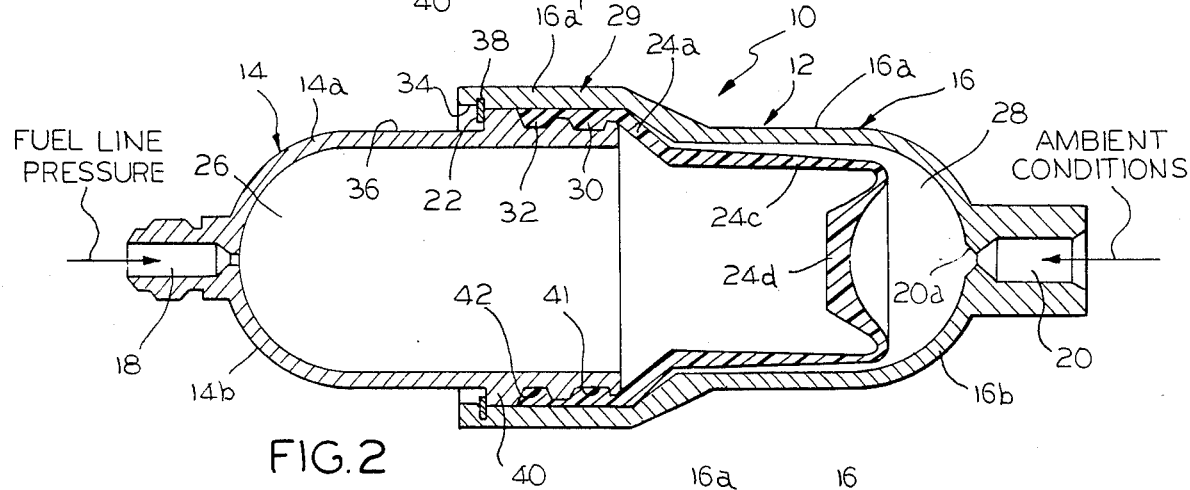
FIG. 2 is a cross-sectional view of the thermal expansion reservoir of FIG. 1 in a partially expanded condition.

As shown in FIGS. 1 and 2, the redundant seal means 29 includes a pair of integral radially inwardly projecting rings defining the primary and secondary seals 30 and 32 which are disposed in axially spaced relation on the resilient bladder 24. The outer surface 36 of the generally cylindrical wall 14a has a pair of circumferentially extending grooves 41 and 42 adapted to receive the radially inwardly projecting rings 30 and 32, respectively, in sealing retention fashion. Additionally, the outermost of the radially inwardly projecting rings 32 is the primary seal and the innermost of the radially inwardly projecting rings 30 is the secondary seal, which is enlarged so that tension loads transmitted through the resilient bladder 24 are of a reduced magnitude on the primary seal of the outermost of the radially inwardly projecting rings 32.

As shown, the inlet port 18 is disposed in the dome-shaped end 14b of one of the first and second housing portions 14. The inlet port 18 accommodates the free flow of fuel to and from the fluid expansion chamber 26. Moreover, the vent 20 is disposed in the dome-shaped end 16b of the other of the first and second housing portions 16.

Still referring to FIGS. 1 and 2, the resilient bladder 24 is joined to the housing 12 intermediate the inlet port 18 and the vent 20. As will be seen by referring to the different views of the resilient bladder 24, it has a first wall portion 24a leading from the housing 12 toward a return bend 24b (see FIG. 1) in the direction of the vent 20 and a second wall portion 24c leading from the first wall portion 24a and about the return bend 24b in the direction of the inlet port 18 where it terminates in an end cap 24d. As formed, the return bend 24b initiates rolling of the second wall portion 24c toward the vent 20. By tapering the second wall portion 24c of the resilient bladder 24 continuously from its juncture with the first wall portion 24a to its juncture with the end cap 24d (see FIG. 2), the second wall portion promotes rolling of the resilient bladder 24 toward the vent 20 responsive to an increase in fluid pressure in the fluid expansion chamber 26, and the resilient bladder 24 is thereafter adapted to roll away from the vent 20 in the direction of the inlet port 18 and away from the inlet port 18 in the direction of the vent 20. As will be appreciated, the rolling action occurs responsive to further changes in fluid pressure in the fluid expansion chamber 26.

With this construction, the end cap 24d is an integral thickened portion of the resilient bladder 24, and the vent 20 has a conical bore 20a facing the pressure relief chamber 28 and the end cap 24d. The conical bore 20a has a gradually reduced diameter in a direction away from the pressure relief chamber 28. Still more particularly, the end cap 24d is greater in diameter than the maximum diameter of the conical bore 20a and is disposed in axial alignment with the conical bore 20a to prevent extrusion of the resilient bladder 24 into the vent 20 (see, also, FIG. 3).

Figure 3:
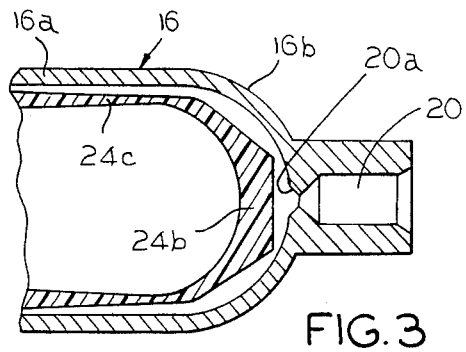
FIG. 3 is a partial cross-sectional view of the thermal expansion reservoir of FIG. 1 in a fully expanded condition.

As will be appreciated by comparing FIGS. 1 through 3, the first and second wall portions 24a and 24c, together with the return bend 24b, accommodates the rolling action in an automatically controlled and substantially frictionless fashion. This rolling action makes it possible to maintain a substantially steady pressure condition within the fuel expansion chamber 26 since the resilient bladder 24 is free to roll away from the vent 20 in the direction of the inlet port 18 and away from the inlet port 18 in the direction of the vent 20 responsive to subsequent decreases and increases in fluid pressure in the fluid expansion chamber 26. Moreover, due to the form of the end cap 24d and the conical bore 20a, the resilient bladder 24 cannot be extruded into the vent 20 even under maximum pressure conditions (see FIG. 3).

Figure 4:
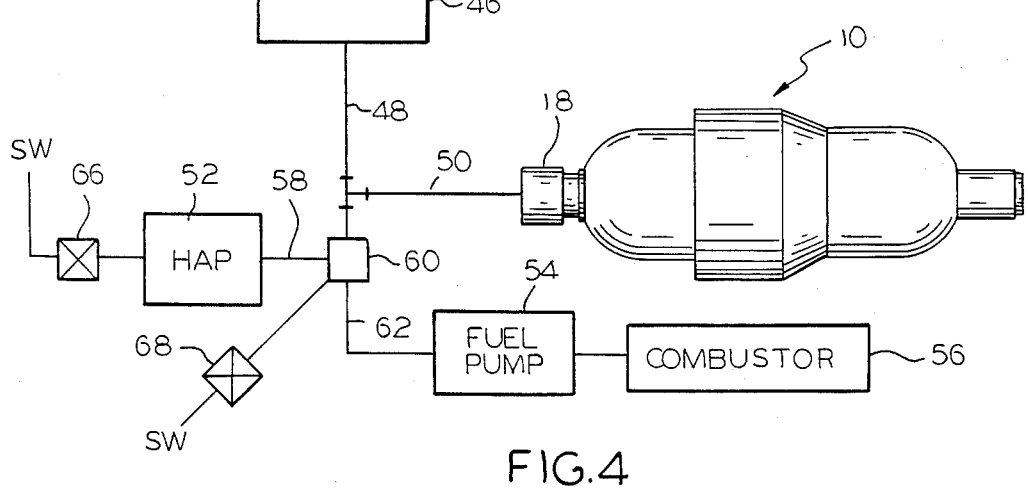
FIG. 4 is a schematic view illustrating the thermal expansion reservoir of FIG. 1 in a fuel system.

Referring to FIG. 4, one application for the thermal expansion reservoir 10 is illustrated where the thermal expansion reservoir is in communication with a fuel tank 46 through fuel lines 48 and 50. It will also be seen that the system includes a tank 52 of hydroxyl ammonium perchlorate which is utilized in torpedo applications where the fuel in the fuel tank 46 is a nitroglycerin-based fuel. It will further be seen that the system includes a fuel pump 54 and a combustor 56 together with a feed line 58 leading from the hydroxyl ammonium perchlorate to a central valve 60 and a feed line 62 leading from the central valve 60 to the fuel pump 54 and the combustor 56. Also as shown, valves 64, 66 and 68 are provided in communication with sea water for pressurizing the fuel tank 46, the tank 52 of hydroxyl ammonium perchlorate, and the central valve 60 for opening the valve by means of the pressure thereof.

As will be appreciated, the fuel tank 46 is normally in communication with the thermal expansion reservoir 10 through the lines 48 and 50 and the inlet port 18 so that regardless of storage conditions and temperatures, the resulting expansion and contraction of the fuel in the fuel tank 46 can be accommodated by means of the thermal expansion reservoir 10. However, when it is desired to operate the system, the valves 64, 66 and 68 are opened to sea water pressure, the nitroglycerine-based fuel in the fuel tank 46 is mixed with the hydroxyl ammonium perchlorate from the tank 52, and the fuel pump 54 delivers the mixture to the combustor 56 for firing the torpedo.

While in the foregoing there has been set forth a preferred embodiment of the invention, it is to be understood that the invention is only to be limited by the spirit and scope of the appended claims.

I claim:

1. A thermal expansion reservoir, comprising:
    a rigid housing having a fluid inlet port in one end and a vent in the other end; and
    a resilient bladder disposed within said housing between said inlet port and said vent, said resilient bladder dividing said housing into a fluid expansion chamber and a pressure relief chamber and being movable toward and away from said vent to vary the relative size of said fluid expansion chamber and said pressure relief chamber responsive to changes in fluid pressure in said fluid expansion chamber, said resilient bladder being joined to said housing intermediate said inlet port and said vent;
    said resilient bladder having a first wall portion leading from said housing in the direction of said vent to a return bend and a second wall portion leading from said first wall portion and about said return bend to extend in the direction of said inlet port terminating in an end cap, said return bend of said resilient bladder being formed to initiate rolling of said second wall portion toward said vent and said second wall portion of said resilient bladder being continuously tapered from said first wall portion to said end cap to promote rolling of said second wall portion toward said vent responsive to an increase in fluid pressure in said fluid expansion chamber, said resilient bladder thereafter being adapted to roll away from said vent in the direction of said inlet port and away from said inlet port in the direction of said vent responsive to further changes in fluid pressure in said fluid expansion chamber.

2. The thermal expansion reservoir as defined by claim 1 wherein said end cap is an intergral thickened portion of said resilient bladder, said vent having a conical bore facing said pressure relief chamber and said end cap, said conical bore having a gradually reduced diameter in a direction away from said pressure relief chamber.

3. The thermal expansion reservoir as defined by claim 2 wherein said end cap is greater in diameter than the maximum diameter of said conical bore and is disposed in axial alignment with said conical bore to prevent extrusion of said resilient bladder into said vent.

4. The thermal expansion reservoir as defined by claim 1 including redundant seal means integrally associated with said first wall portion of said resilient bladder, said redundant seal means cooperating with said housing to form primary and secondary seals, said redundant seal means also joining said resilient bladder to said housing.

5. The thermal expansion reservoir as defined by claim 4 wherein said redundant seal means includes a pair of integral radially projecting rings disposed in axially spaced relation on said resilient bladder, said housing including a pair of circumferentially extending grooves adapted to receive said radially projecting rings in sealing retention fashion.

6. The thermal expansion reservoir as defined by claim 5 wherein the outermost of said radially projecting rings is said primary seal and the innermost of said radially projecting rings is said secondary seal, said secondary seal being enlarged so that tension loads transmitted through said resilient bladder are of a reduced magnitude on said primary seal formed by the outermost of said radially projecting rings.

7. A thermal expansion reservoir, comprising:
a rigid housing including first and second housing portions, said housing having a fluid inlet port in one of said first and second housing portions and a vent in the other of said first and second housing portions, and including means for releasably interconnecting said housing portions;
said housing portions being releasably interconnected in telescopically overlapped relationship;
a resilient bladder disposed within said housing between said inlet port and said vent, said resilient bladder dividing said housing into a fluid expansion chamber and a pressure relief chamber and being movable toward and away from said vent to vary the relative size of said fluid expansion chamber and said pressure relief chamber responsive to changes in fluid pressure in said fluid expansion chamber, said resilient bladder being joined to said housing between said housing portions; and
redundant seal means integrally associated with said resilient bladder, said redundant seal means being disposed in spaced relation and cooperating with said releasable interconnecting means to form primary and secondary seals between said housing portions, said redundant seal means also joining said resilient bladder to said housing;
said resilient bladder having a first wall portion leading from said housing in the direction of said vent to a return bend and a second wall portion leading from said first wall portion and about said return bend to extend in the direction of said inlet port terminating in an end cap, said return bend of said resilient bladder being formed to initiate rolling of said second wall portion at said return bend toward said vent and said second wall portion of said resilient bladder being continuously tapered from said first wall portion to said end cap to promote rolling of said second wall portion toward said vent in an automatically controlled and substantially frictionless fashion responsive to an increase in fluid pressure in said fluid expansion chamber, said resilient bladder thereafter being adapted to roll relative to said return bend away from said vent in the direction of said inlet port and away from said inlet port in the direction of said vent responsive to subsequent decreases and increases in fluid pressure in said fluid expansion chamber.

8. The thermal expansion reservoir as defined by claim 7 wherein said first and second housing portions each include a generally cylindrical wall terminating in a dome-shaped end, said dome-shaped ends of said first and second housing portions being disposed in axially spaced relation remote from said redundant seal means of said resilient bladder.

9. The thermal expansion reservoir as defined by claim 8 wherein said generally cylindrical walls are of substantially identical diameter with one of said generally cylindrical walls having an enlarged diameter wall portion remote from said dome-shaped ends for telescopically receiving the other of said generally cylindrical walls intermediate said inlet port and said vent.

10. The thermal expansion reservoir as defined by claim 9 wherein said releasable interconnecting means includes a snap ring disposed between an inner surface of said enlarged diameter wall portion of the one of said walls and an outer surface of the other of said walls in externally spaced relation to said redundant seal means of said resilient bladder.

11. The thermal expansion reservoir as defined by claim 9 wherein said redundant seal means includes a pair of integral radially inwardly projecting rings disposed in axially spaced relation on said resilient bladder, an outer surface of the other of said generally cylindrical walls having a pair of circumferentially extending grooves adapted to receive said radially inwardly projecting rings in sealing retention fashion.

12. The thermal expansion reservoir as defined by claim 11 wherein the outermost of said radially inwardly projecting rings is said primary seal and the innermost of said radially inwardly projecting rings is said secondary seal, said secondary seal being enlarged so that tension loads transmitted through said resilient bladder are of a reduced magnitude on said primary seal defined by the outermost of said radially inwardly projecting rings.

13. The thermal expansion reservoir as defined by claim 8 wherein said inlet port is disposed in said dome-shaped end of one of said first and second housing portions and said vent is disposed in said dome-shaped end of the other of said first and second housing portions.

14. The thermal expansion reservoir as defined by claim 7 wherein said end cap is an integral thickened portion of said resilient bladder, said vent having a conical bore facing said pressure relief chamber and said end cap, said conical bore having a gradually reduced diameter in a direction away from said pressure relief chamber.

15. The thermal expansion reservoir as defined by claim 14 wherein said end cap is greater in diameter than the maximum diameter of said conical bore and is disposed in axial alignment with said conical bore to prevent extrusion of said resilient bladder into said vent.

16. The thermal expansion reservoir as defined by claim 7 wherein said housing is formed of metal and said resilient bladder is formed of rubber.

* * * * *